US012785908B2

(12) United States Patent
Maleki et al.

(10) Patent No.: US 12,785,908 B2
(45) Date of Patent: Nov. 3, 2026

(54) ADAPTIVE CSI MEASUREMENT AND REPORTING FOR BWPS WITH DIFFERENT NUMBER OF LAYERS

(71) Applicant: Telefonaktiebolaget LM Ericsson (publ), Stockholm (SE)

(72) Inventors: Sina Maleki, Malmö (SE); Niklas Andgart, Södra Sandby (SE); Ilmiawan Shubhi, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 702 days.

(21) Appl. No.: 17/631,930

(22) PCT Filed: Aug. 11, 2020

(86) PCT No.: PCT/EP2020/072537

§ 371 (c)(1),
(2) Date: Feb. 1, 2022

(87) PCT Pub. No.: WO2021/032541

PCT Pub. Date: Feb. 25, 2021

(65) Prior Publication Data

US 2022/0255711 A1 Aug. 11, 2022

Related U.S. Application Data

(60) Provisional application No. 62/887,821, filed on Aug. 16, 2019.

(51) Int. Cl.

*H04L 5/00* (2006.01)
*H04B 7/06* (2006.01)
*H04L 1/1812* (2023.01)

(52) U.S. Cl.

CPC ......... *H04L 5/0092* (2013.01); *H04B 7/0626* (2013.01); *H04L 1/1812* (2013.01); *H04L 5/0053* (2013.01); *H04L 5/006* (2013.01)

(58) Field of Classification Search

CPC ... H04L 5/0092; H04L 1/1812; H04L 5/0053; H04L 5/006; H04L 25/0204; H04L 5/0057; H04B 7/0626

See application file for complete search history.

(56) References Cited

U.S. PATENT DOCUMENTS

2012/0213137 A1* 8/2012 Jeong ................ H04W 52/0235 370/311
2015/0029952 A1* 1/2015 Huang .................. H04L 1/1812 370/329

(Continued)

FOREIGN PATENT DOCUMENTS

WO 2019017753 A1 1/2019
WO WO-2021027920 A1 * 2/2021 ........... H04B 7/0456

OTHER PUBLICATIONS

International Search Report and Written Opinion dated Oct. 28, 2020 for International Application No. PCT/EP2020/072537 filed Aug. 11, 2020, consisting of 11 pages.

(Continued)

*Primary Examiner* — John D Blanton
(74) *Attorney, Agent, or Firm* — Sage Patent Group

(57) ABSTRACT

A method, system, network node and wireless device are disclosed. In one or more embodiments, a network node configured to communicate with a wireless device (WD) is provided. The network node is configured to, and/or has a radio interface and/or has processing circuitry configured to receive at least one channel state information, CSI, report associated with at least one CSI measurement using more (Continued)

antennas than a maximum number of layers configured for a current active bandwidth part, BWP.

11 Claims, 6 Drawing Sheets

(56) References Cited

U.S. PATENT DOCUMENTS

| | | | | |
|---|---|---|---|---|
| 2015/0063481 | A1* | 3/2015 | Von Wrycza | H04B 7/0691 375/267 |
| 2016/0285525 | A1* | 9/2016 | Budianu | H04L 5/0057 |
| 2016/0285591 | A1* | 9/2016 | Dortmund | H04L 1/1877 |
| 2017/0272200 | A1* | 9/2017 | Dinan | H04L 5/0091 |
| 2019/0150172 | A1* | 5/2019 | Ang | H04W 72/1268 370/329 |
| 2019/0230590 | A1* | 7/2019 | Wu | H04W 52/0274 |
| 2019/0356428 | A1* | 11/2019 | Jia | H04L 1/1825 |
| 2019/0363843 | A1* | 11/2019 | Gordaychik | H04L 1/0013 |
| 2020/0084759 | A1* | 3/2020 | Liu | H04L 1/1671 |
| 2020/0228282 | A1* | 7/2020 | Kwak | H04L 5/0057 |
| 2020/0245333 | A1* | 7/2020 | Lin | H04L 5/0094 |
| 2020/0364187 | A1* | 11/2020 | Tran | G06F 16/1824 |
| 2020/0396760 | A1* | 12/2020 | Yi | H04L 1/1812 |
| 2020/0404690 | A1* | 12/2020 | Lee | H04L 5/001 |
| 2021/0044990 | A1* | 2/2021 | Khawand | H04B 7/0689 |
| 2021/0159966 | A1* | 5/2021 | Xi | H04B 7/0404 |
| 2021/0168812 | A1* | 6/2021 | Huang | H04B 7/0691 |
| 2021/0195517 | A1* | 6/2021 | Yang | H04W 52/0212 |
| 2021/0298038 | A1* | 9/2021 | Kang | H04L 5/0057 |
| 2021/0360683 | A1* | 11/2021 | Chen | H04L 1/1896 |
| 2021/0409174 | A1* | 12/2021 | Yum | H04L 5/0048 |
| 2022/0158716 | A1* | 5/2022 | Tie | H04B 7/0413 |
| 2022/0159574 | A1* | 5/2022 | Islam | H04W 52/0229 |
| 2022/0182893 | A1* | 6/2022 | da Silva | H04W 24/10 |
| 2022/0182942 | A1* | 6/2022 | Guo | H04W 52/0235 |
| 2022/0240187 | A1* | 7/2022 | Guo | H04L 5/0053 |
| 2022/0255711 | A1* | 8/2022 | Maleki | H04L 5/0092 |
| 2022/0304024 | A1* | 9/2022 | Maleki | H04B 7/063 |
| 2022/0312354 | A1* | 9/2022 | Teyeb | H04B 7/06952 |
| 2022/0312440 | A1* | 9/2022 | Bagheri | H04W 72/044 |
| 2022/0321178 | A1* | 10/2022 | Maleki | H04L 1/0036 |
| 2023/0144736 | A1* | 5/2023 | Yao | H04W 72/0457 370/329 |
| 2024/0275567 | A1* | 8/2024 | Babaei | H04W 76/28 |

OTHER PUBLICATIONS

3GPP TSG RAN WG1 Meeting #96 R1-1903353; Title: NR UE Power Saving Designs; Agenda Item: 7.2.9.2; Source: MediaTek Inc.; Document for: Discussion and Decision; Location and Date: Athens, Greece, Feb. 25-Mar. 1, 2019, consisting of 28 pages.

3GPP TS 38.321 V15.5.0; 3rd Generation Partnership Project; Technical Specification Group Radio Access Network; NR; Medium Access Control (MAC) protocol specification (Release 15); Mar. 2019, consisting of 78 pages.

* cited by examiner

ADAPTIVE CSI MEASUREMENT AND REPORTING FOR BWPS WITH DIFFERENT NUMBER OF LAYERS

CROSS-REFERENCE TO RELATED APPLICATIONS

This application is a Submission Under 35 U.S.C. § 371 for U.S. National Stage Patent Application of International Application No.: PCT/EP2020/072537, filed Aug. 11, 2020 entitled "ADAPTIVE CSI MEASUREMENT AND REPORTING FOR BWPS WITH DIFFERENT NUMBER OF LAYERS," which claims priority to U.S. Provisional Application No. 62/887,821, filed Aug. 16, 2019, entitled "ADAPTIVE CSI MEASUREMENT AND REPORTING FOR BWPS WITH DIFFERENT NUMBER OF LAYERS," the entireties of both of which are incorporated herein by reference.

FIELD

The present disclosure relates to wireless communications, and in particular, to channel state information (CSI) measurements.

INTRODUCTION

A Bandwidth Part (BWP) is a contiguous set of physical resource blocks (PRBs) on a carrier. These RBs are selected from a contiguous subset of the common resource blocks for a numerology (u). Each BWP that is defined for a numerology can have following three different parameters:

Subcarrier spacing

Symbol duration

Cyclic prefix (CP) length

FIG. 1 is a diagram of example BWP configurations. BWP Configuration Properties may include that:

- The wireless device can be configured with maximum of four BWPs for Downlink and Uplink but at a given point of time only one BWP may be active for downlink and one for uplink.
- BWP helps enable wireless devices to operate in narrow bandwidth and when wireless devices demand more data such as for bursty traffic, the wireless device can inform the network node to enable wider bandwidth.
- When the network node configures a BWP, the following parameters may be included in the configuration: BWP Numerology (u), BWP bandwidth size, Frequency location (NR-ARFCN), CORESET (Control Resource Set).
- With respect to the downlink, the wireless device is not expected to receive physical downlink shared channel (PDSCH), physical downlink control channel (PDCCH), channel state information reference signal (CSI-RS), or TRS outside an active bandwidth part.
- Each DL BWP may include at least one CORESET with UE Specific Search Space (USS) while a Primary carrier that may correspond to at least one of the configured DL BWPs includes one CORESET with common search space (CSS).
- With respect to uplink, the wireless device may not transmit PUSCH or PUCCH outside an active bandwidth part.
- Wireless devices are expected to receive and transmit only within the frequency range configured for the active BWPs with the associated numerologies. However, there may be exceptions such as if a wireless device performs a Radio Resource Management (RRM) measurement or transmits sounding reference signal (SRS) outside of its active BWP via measurement gap.

BWP Activation/Deactivation and Switching

According to third generation partnership standards (3GPP) such as 3GPP Technical Specification (TS) 38.321-5.15, Bandwidth Part (BWP) operation and BWP selection (or BWP switching) can be performed in one or more of the following manners:

- Dedicated radio resource control (RRC) Signaling
- Over physical downlink control channel (PDCCH), Downlink control information (DCI)—DCI 0_1 (UL Grant) and DCI 1_0 (DL Scheduling)
- By bwp-inactivityTimer—ServingCellConfig.bwp-InactivityTimer
- By medium access control (MAC) CE (Control Element)

The DCI based mechanism for BWP operation and/or selection, although more prompt than the one based on MAC CE, requires additional consideration for error case handling such as the case when a wireless device fails to decode the DCI containing the BWP activation/deactivation command. To help recover from such a DCI lost scenarios, the activation/deactivation of DL BWP (or DL/UL BWP pair for the case of unpaired spectrum) by a timer (bwp-inactivityTimer) is provided. With this timer mechanism, if a wireless is not scheduled for a certain/predefined amount of time such as to allow for expiration of timer, the wireless device switches its active DL BWP (or DL/UL BWP pair) to the default one.

There is an initial active BWP for a wireless device during the initial access where BWP may change when the wireless device is explicitly configured with BWPs during or after RRC connection establishment. The initial active BWP is the default BWP, unless configured otherwise.

Multi-Layer PDSCH:

PDSCH is the physical channel used for transmitting the downlink shared channel data to the wireless device. The transmission over PDSCH can be based on multi-layer transmission, employing spatial processing among several antennas (antenna ports). In New Radio (NR, also referred to as $5^{th}$ Generation (5G)), a DL transmission can be up to 4 layers for a single codeword, or up to 8 layers for a two codewords transmission.

The wireless device may be configured via higher layers to expect a maximum number of layers per cell for DL transmission as may be described in 3GPP Release 15 (3GPP Rel 15) where this configuration may possibly be extended per BWP in 3GPP Rel 16. Furthermore, the wireless device may become aware of the exact number of layers the current data is transmitted in after decoding a scheduling DCI of format 1-1. As such, one way of layer adaptation for the network node is to configure the wireless device with different BWPs associated with a different number of layers and then using a BWP change DCI adapt the number of layers.

CSI Report:

A wireless device can be configured with periodic CSI-RS reports or based on aperiodic CSI reports triggered by the network node. A CSI report may include of a number of reports, e.g., RI, CQI, PMI, and so on. The network node may take the CSI report into account while scheduling the wireless device for PDSCH (or PUSCH if there is reciprocity) transmissions.

There is discussion to allow the network node to configure maximum number of layers for each BWP. This can potentially allow the wireless device to limit the number of active antenna branches or to deploy other proprietary solutions for antenna adaptation based on the knowledge of maximum number of layers, and thus lead to power savings at the wireless device, particularly when the maximum number of layers are low.

While such a possible configuration can potentially lead to power savings, this is not guaranteed in existing 3GPP standards where the network node can schedule the wireless device with a different BWP by sending the PDCCH in the current BWP. However, such scheduling may occur without the network node having perfect knowledge of CSI for the new BWP since the wireless device is not expected to provide a CSI report on non-active BWPs where the new BWP was a previously non-active BWP. Since the frequency location of the new BWP may differ and/or the transmission may use a larger number of layers, the network node may schedule the wireless device blindly (e.g., without knowledge of communication characteristics associated with BWP), leading to unsuccessful reception of PDSCH, and thereby leading to HARQ NACKs, and potentially repeating the same pattern. This in turn leads to a waste of power at the wireless device side, as well as waste of valuable resources at the network node. This problem is particularly evident when the wireless device is scheduled to move to the BWP with a higher number of layers.

SUMMARY

Therefore, there is a need for providing the network node with reliable CSI measurements while operating within the current BWP to help avoid situations described above. Some embodiments advantageously provide methods, systems, and apparatuses for CSI measurements.

Aspects are provided by independent claim appended hereto, and embodiments thereof are provided by dependent claims.

According to a first aspect, there is provided a network node configured to communicate with a wireless device, WD. The network node is configured to, and/or comprising a radio interface and/or comprising processing circuitry configured to receive at least one channel state information, CSI, report associated with at least one CSI measurement using more antennas than a maximum number of layers configured for a current active bandwidth part, BWP.

The network node may be configured to, and/or the radio interface and/or processing circuitry may be configured to initiate the at least one CSI measurement using the more antennas.

The at least one CSI measurement may be associated with an anticipated transition of the WD from a current BWP to another BWP.

According to a second aspect, there is provided a method implemented in a network node that is configured to communicate with a wireless device. The method comprises receiving at least one channel state information, CSI, report associated with at least one CSI measurement using more antennas than a maximum number of layers configured for a current active bandwidth part, BWP. The method may comprise initiating the at least one CSI measurement using the more antennas. The at least one CSI measurement may be associated with an anticipated transition of the wireless device from a current BWP to another BWP.

According to a third aspect, there is provided a wireless device, WD, configured to communicate with a network node. The WD is configured to, and/or comprising a radio interface and/or processing circuitry configured to perform at least one channel state information, CSI, measurement using more antennas than a maximum number of layers configured for a current active bandwidth part, BWP.

The WD may be configured to, and/or the radio interface and/or processing circuitry is configured to initiate the using of the more antennas for the at least one CSI measurement.

The WD may be configured to, and/or the radio interface and/or processing circuitry may be configured to receive a request from the network node to use the more antennas for the at least one CSI measurement.

The at least one CSI measurement may be associated with an anticipated transition of the WD from a current BWP to another BWP.

The current BWP may be a first bandwidth part, BWP1, with a first maximum number of layers, L1, and the another BWP may be a second bandwidth part, BWP2, with a second maximum number of layers, L2, where L1 is larger than L2, and the WD and/or the radio interface and/or processing circuitry may be configured to initially use all receiver antennas or a higher number of antennas than L2 on a move to BWP2. The initial use of all receiver antennas or a higher number of antennas than the L2 on the move to BWP2 may include to use all receiver antennas or a higher number of antennas than the L2, and then after a predetermined number of scheduling instances to turn off one or more receiver antennas. The WD and/or the radio interface and/or processing circuitry may be configured to, based on an indication of a number of hybrid automatic request, HARQ, acknowledgement/non-acknowledgements, ACKs/NACKs, adapt a number of used receiver antennas such that when the number of NACKs is greater than a predefined level additional antennas are turned ON, and when the number of NACKs is below the predetermined level one or more antennas are turned OFF.

The WD and/or the radio interface and/or processing circuitry may be configured to omit power saving until a first CSI measurement or first N CSI measurements are performed, where N is a predetermined number, and then the WD may apply a power saving antenna adaptation.

According to a fourth aspect, there is provided a method implemented in a wireless device, WD, that is configured to communicate with a network node. The method comprises performing at least one channel state information, CSI, measurement using more antennas than a maximum number of layers configured for a current active bandwidth part, BWP.

The method may comprise initiating the using of the more antennas for the at least one CSI measurement.

The method may comprise receiving a request from the network node to use the more antennas for the at least one CSI measurement.

The at least one CSI measurement may be associated with an anticipated transition of the WD from a current BWP to another BWP. The current BWP may be a first bandwidth part, BWP1, with a first maximum number of layers, L1, and the another BWP may be a second bandwidth part, BWP2, with a second maximum number of layers, L2, where L1 is larger than L2, wherein the method may comprise initially using all receiver antennas or a higher number of antennas than L2 on a move to BWP2. The initial using of all receiver antennas or a higher number of antennas than the L2 on the move to BWP2 may include using all receiver antennas or a higher number of antennas than the L2, and then after a predetermined number of scheduling instances turning off one or more receiver antennas. The method may comprise adapting a number of used receiver antennas based on an indication of a number of hybrid automatic request, HARQ, acknowledgement/non-acknowledgements, ACKs/NACKs, such that when the number of NACKs is greater than a predefined level additional antennas are turned ON, and when the number of NACKs is below the predetermined level one or more antennas may be turned OFF.

The method may comprise omitting power saving until a first CSI measurement or first N CSI measurements are performed, where N is a predetermined number, and then applying a power saving antenna adaptation.

One or more embodiments of the disclosure relates to mechanisms/processes that the wireless device can employ to provide more reliable CSI reports (when compared to, for example, existing systems) about the non-active BWPs or BWP configurations.

In one or more embodiments, the wireless device may adaptively perform CSI measurements and reporting using more antennas than the maximum number of layers configured for the current active BWP. In one or more embodiments, the CSI measurements and reporting using more antennas is performed regularly, periodically or triggered by changes in operating situation of the wireless device that indicates an imminent BWP change. If the anticipated BWP does not overlap in frequency, filtering or offsets may be added to CSI reports to help ensure robustness for operation in the new (i.e., anticipated) BWP. In one or more embodiments, the network node may initiate/request CSI measurements using more antennas than the maximum number of layers configured for the current active BWP.

Therefore, one or more embodiments described herein allows the wireless device to help the network node acquire knowledge about the CSI in upcoming (i.e., anticipated, new, etc.) BWPs, thereby avoiding multiple unsuccessful PDSCH reception instances in conjunction with BWP switching due to, for example, configuring BWPs on CSI reports that do not accurately represent the upcoming BWPs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
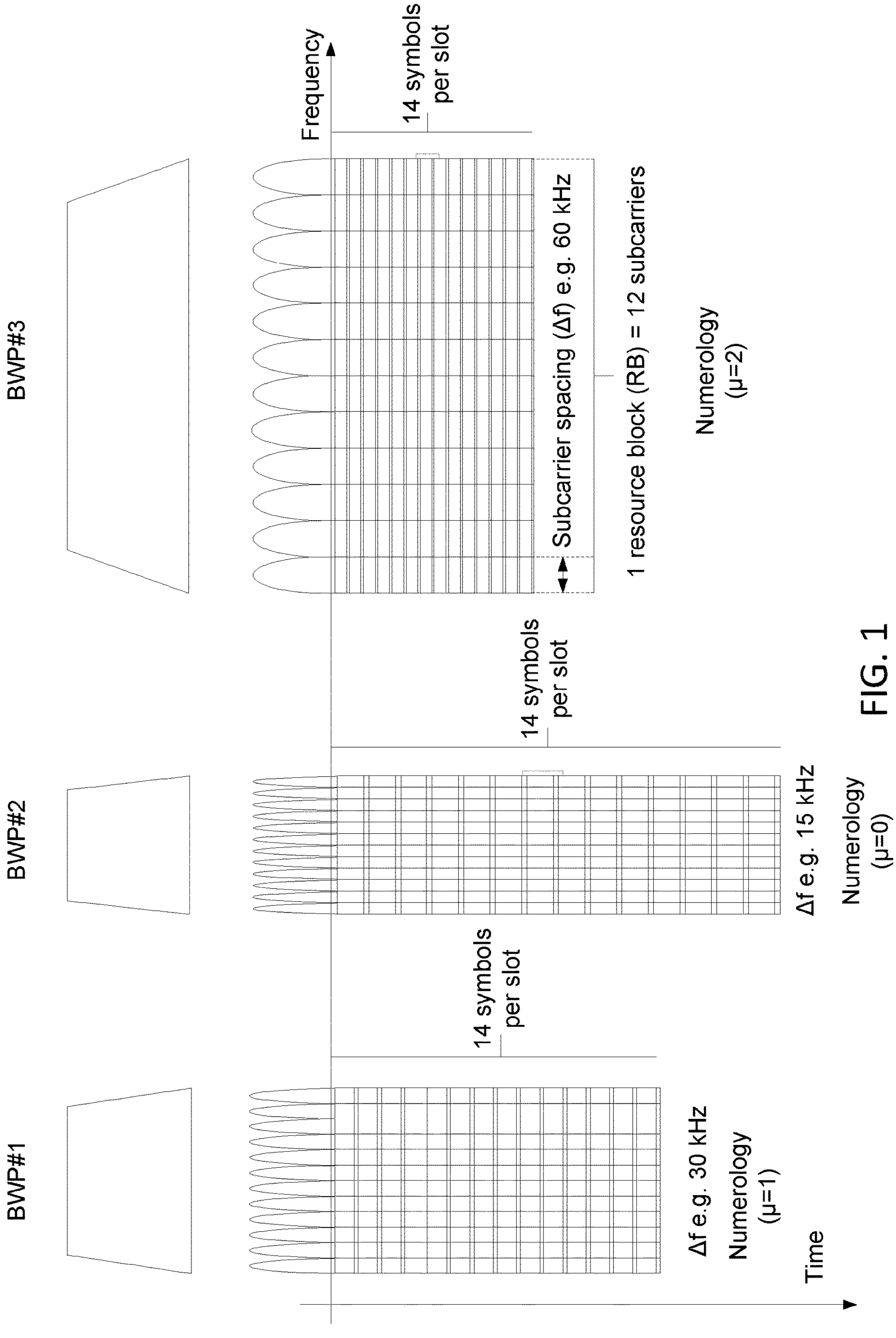
FIG. 1 is a diagram of BWP configurations.

Before describing in detail exemplary embodiments, it is noted that the embodiments reside primarily in combinations of apparatus components and processing steps related to CSI measurements. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., setting for CSI measurements. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for CSI measurements such as adaptive CSI measurements that may be performed using more antennas than a maximum number of layers configured for a current active bandwidth part, BWP, as described herein.

Figure 2:
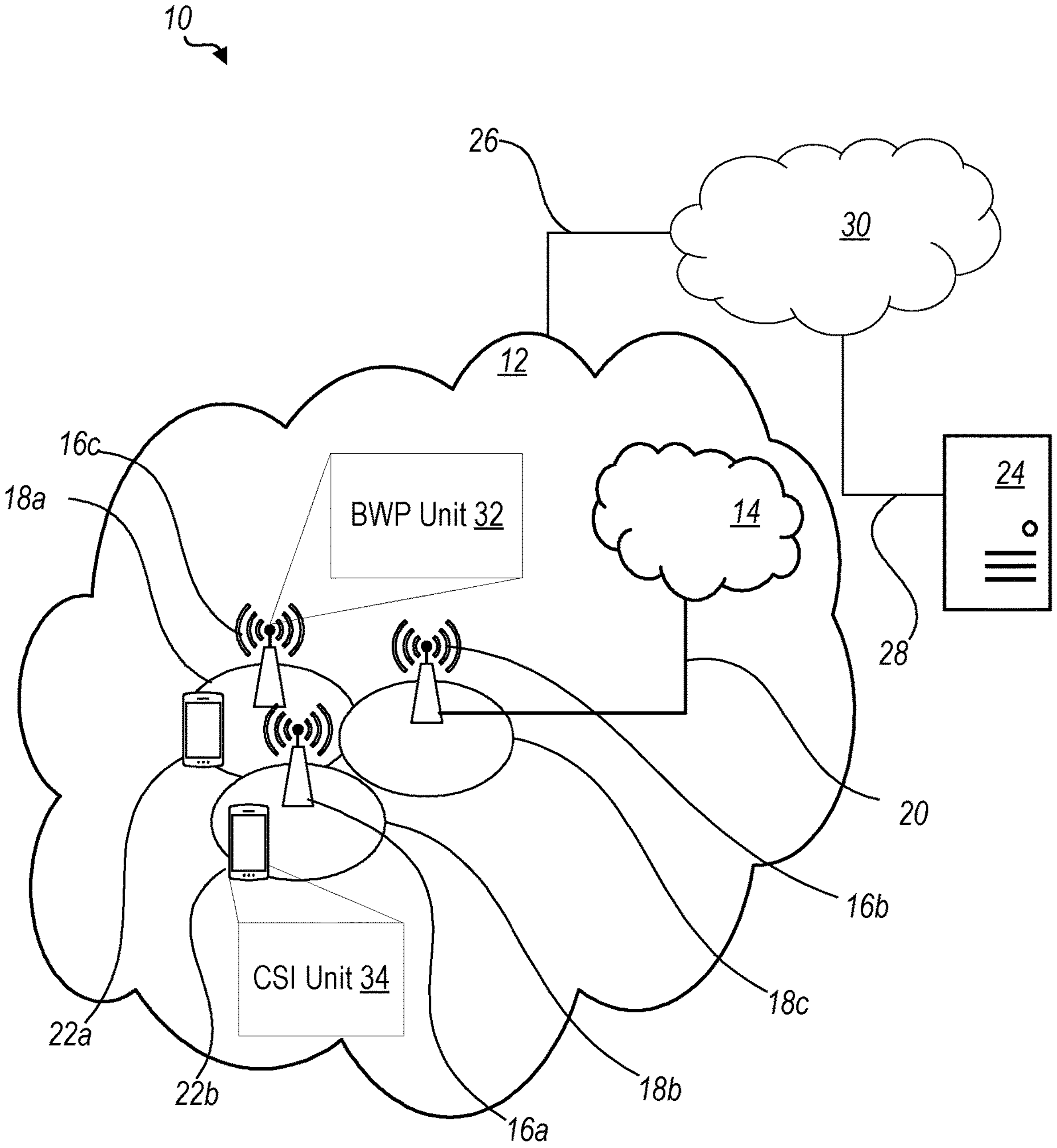
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*c*. A second WD 22*b* in coverage area 18*b* is wirelessly connectable to the corresponding network node 16*a*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a BWP unit 32 which is configured to perform one or more network node 16 functions as described herein such as with respect to CSI measurements and/or BWP configuration. A wireless device 22 is configured to include a CSI unit 34 which is configured to perform one or more wireless device 22 function as described herein such as with respect to CSI measurements and/or implement a BWP configuration.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, store, forward, receive, transmit, relay, determine, etc., information associated with performing CSI measurements using more antennas than a maximum number of layers configured for a current active bandwidth part, BWP and/or BWP configuration, as described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include BWP unit 32 configured to perform one or more network node 16 functions as described herein such as with respect to CSI measurements and BWP configuration.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a CSI unit 34 configured to perform one or more wireless device 22 functions as descried herein such as with respect to CSI measurements and/or BWP configuration.

Figure 3:
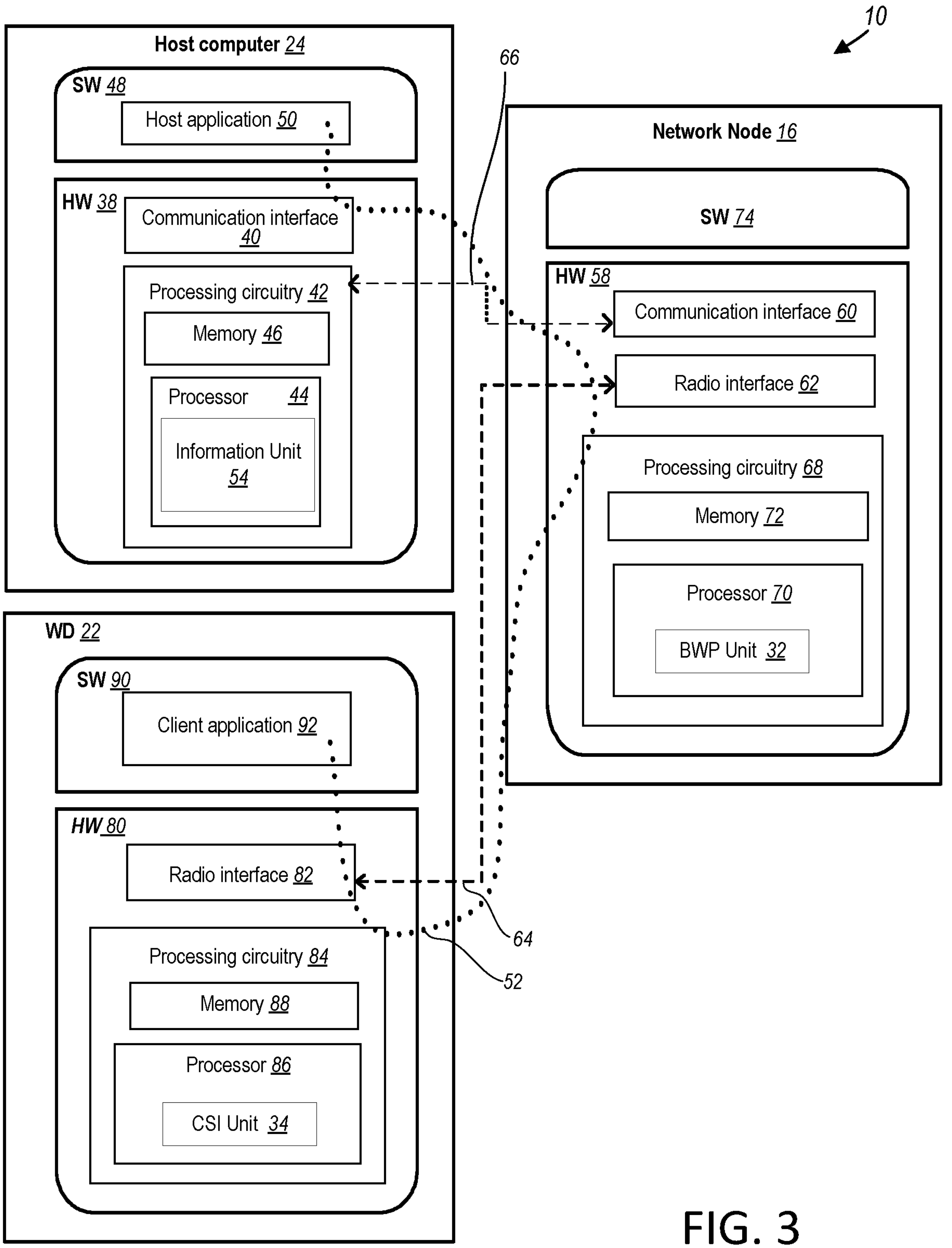
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as BWP unit 32, and CSI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
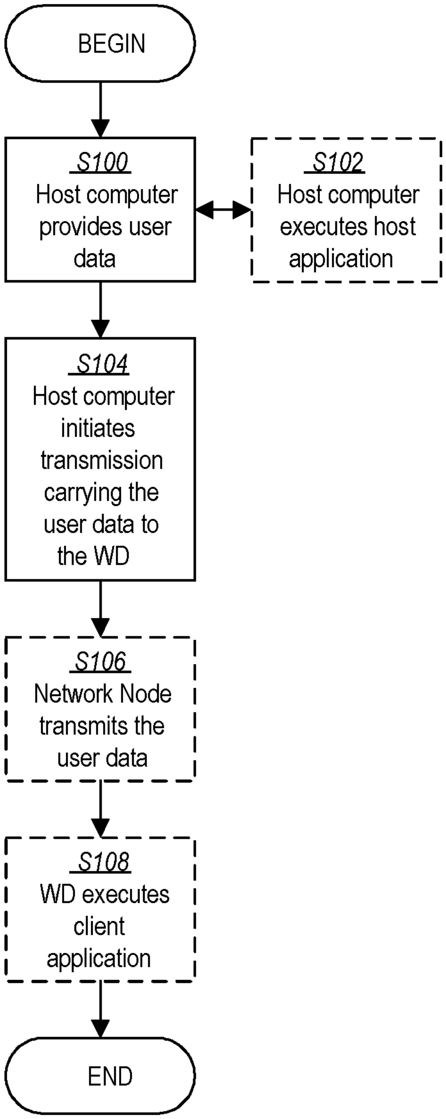
FIG. 4 is a flowchart illustrating exemplary methods implemented in a communication system including a host computer, a network node and a wireless device for executing a client application at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 5:
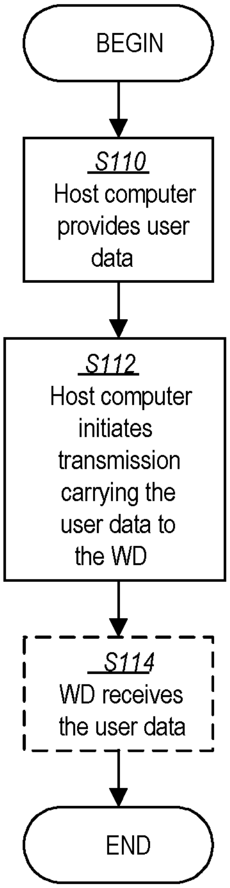
FIG. 5 is a flowchart illustrating exemplary methods implemented in a communication system including a host computer, a network node and a wireless device for receiving user data at a wireless device according to some embodiments of the present disclosure.

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
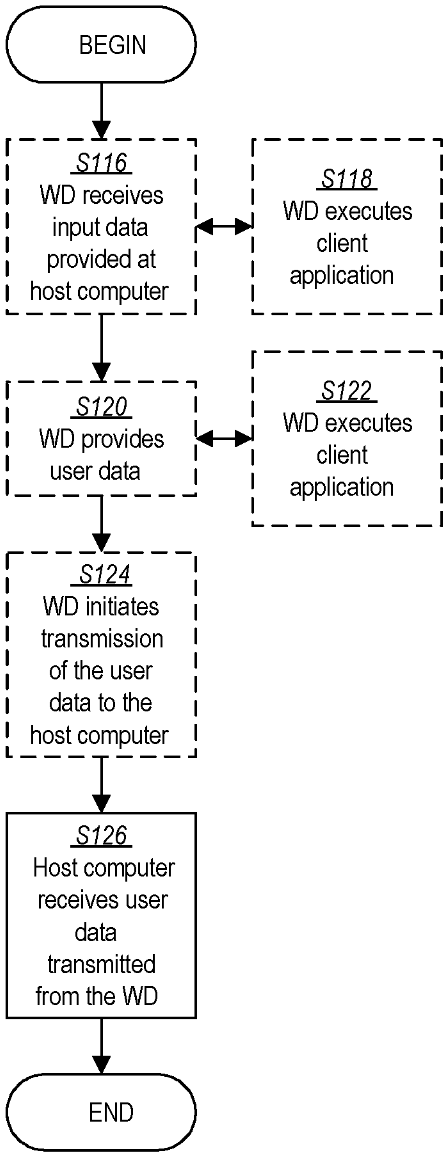
FIG. 6 is a flowchart illustrating exemplary methods implemented in a communication system including a host computer, a network node and a wireless device for receiving user data from the wireless device at a host computer according to some embodiments of the present disclosure.

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
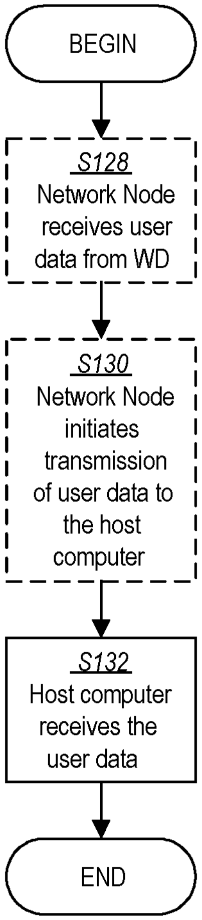
FIG. 7 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 8:
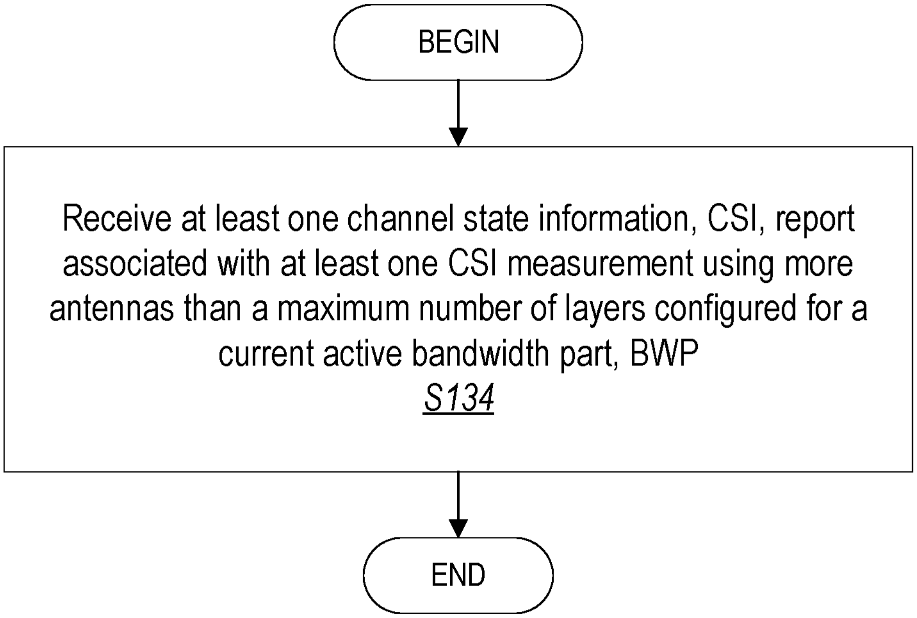
FIG. 8 is a flowchart of an exemplary process in a network node according to some embodiments of the present disclosure.

FIG. 8 is a flowchart of an example process in a network node 16 according to one or more embodiments of the disclosure. One or more Blocks and/or functions performed by network node 16 may be performed by one or more elements of network node 16 such as by BWP unit 32 in processing circuitry 68, processor 70, radio interface 62, etc. In one or more embodiments, network node 16 such as via one or more of processing circuitry 68, processor 70, communication interface 60 and radio interface 62 is configured to receive (Block S134) at least one channel state information, CSI, report associated with at least one CSI measurement using more antennas than a maximum number of layers configured for a current active bandwidth part, BWP.

According to one or more embodiments, the network node 16 is further configured to, and/or the radio interface 62 and/or processing circuitry 68 is further configured to initiate the at least one CSI measurement using the more antennas. According to one or more embodiments, the at least one CSI measurement is associated with an anticipated transition of the wireless device 22 from a current BWP to another BWP. According to one or more embodiments, the network node 16 is further configured to, and/or the radio interface 62 and/or processing circuitry 68 is further configured determine a BWP to which to transition the wireless device 22 to, and informing the wireless device of the determined BWP. The wireless device 22 transitioning from a current BWP to the determined BWP. In one or more embodiments, the CSI measurement configuration is modified/adapted to measure at least characteristics associated with a non-active BWP or a BWP other than a current active BWP on which the wireless device 22 is operating. In other words, the CSI measurement are adaptive or dynamically adapted/modified as described herein.

Figure 9:
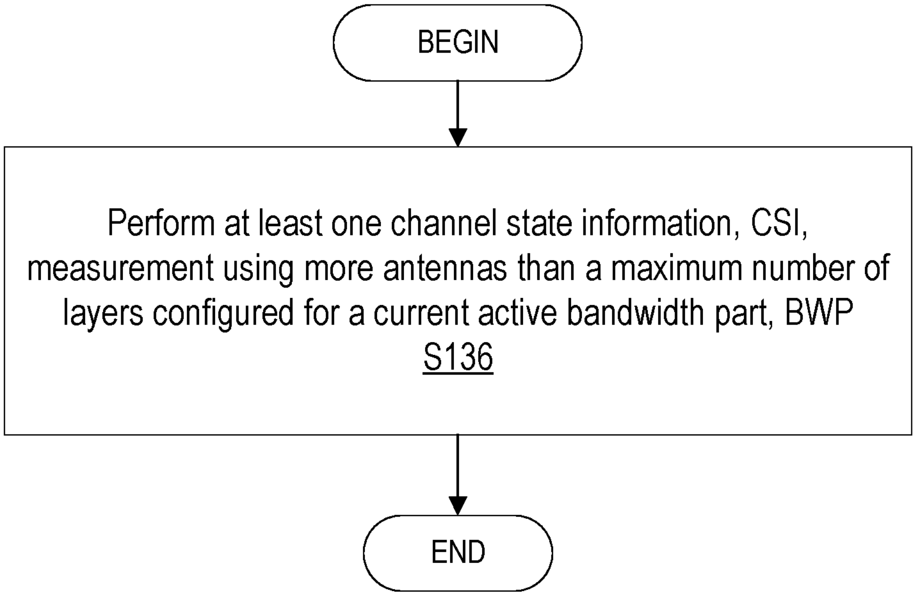
FIG. 9 is a flowchart of an exemplary process in a wireless device according to some embodiments of the present disclosure.

FIG. 9 is a flowchart of an example process in a wireless device 22 according to one or more embodiments of the disclosure. One or more Blocks and/or functions performed by wireless device 22 may be performed by one or more elements of wireless device 22 such as by CSI unit 34 in processing circuitry 84, processor 86, radio interface 82, etc. In one or more embodiments, wireless device such as via one or more of processing circuitry 84, processor 86 and radio interface 82 is configured to perform (Block S136) at least one channel state information, CSI, measurement using more antennas than a maximum number of layers configured for a current active bandwidth part, BWP.

According to one or more embodiments, the WD 22 is further configured to, and/or the radio interface 82 and/or processing circuitry 84 is further configured to initiate the using of the more antennas for the at least one CSI measurement. According to one or more embodiments, the WD 22 is further configured to, and/or the radio interface 82 and/or processing circuitry 84 is further configured to receive a request from the network node 16 to use the more antennas for the at least one CSI measurement. According to one or more embodiments, the at least one CSI measurement is associated with an anticipated transition of the wireless device 22 from a current BWP to another BWP.

Having described the general process flow of arrangements of the disclosure and having provided examples of hardware and software arrangements for implementing the processes and functions of the disclosure, the sections below provide details and examples of arrangements for configuring and/or performing CSI measurements such as using more antennas than a maximum number of layers configured for a current active bandwidth part, BWP.

Embodiments provide configuring and/or performing CSI measurements such as using more antennas than a maximum number of layers configured for a current active bandwidth part, BWP.

Having generally described arrangements for configuring and/or performing CSI measurements such as using more antennas than a maximum number of layers configured for a current active bandwidth part, BWP, details for these arrangements, functions and processes are provided as follows, and which may be implemented by the network node 16, wireless device 22 and/or host computer 24.

System Assumptions

In one or more embodiments described herein, it is assumed that the wireless device 22 is configured with multiple BWPs where each BWP may be associated with or correspond to a potentially different maximum number of layers than other BWPs. For simplicity of discussion, it is assumed herein that the wireless device 22 is configured with BWP1 and BWP2, each BWP with a maximum number of layers L1 and L2, respectively. Furthermore, in examples and/or embodiments described herein, it is assumed that the network node 16 intends to move the wireless device 22 from BWP1 to BWP2. Nevertheless, is it understood that the teachings described herein are equally applicable to more than two BWPs. Layers may refer to Multiple-In Multiple-Out (MIMO) layers.

Providing CSI When BWP2 Frequency Allocation is Not Outside BWP1

In one or more embodiments, it is assumed that L2>L1, i.e., the maximum number of layers for BWP2 is greater than the maximum number of layers for BWP1. In case BWP2 is within BWP1 (e.g., similar central frequency and BW but different configuration, or similar central frequency and BW2 smaller than BW1, or not the same central frequency but still BWP is within BWP1), the wireless device 22 may occasionally (i.e., periodically or based on a predefined timer or trigger) perform such as via one or more of processing circuitry 84, processor 86, radio interface 82, CSI unit 34, etc., CSI measurements with all the antenna elements, or a subset of all the antenna elements equal to L2. In one or more embodiments, the wireless device 22 is configured to use a different number of antennas or antenna elements other than a maximum or preconfigured number of layers configured for the current active BWP. In one example, the wireless device 22 such as via one or more of processing circuitry 84, processor 86, radio interface 82, CSI unit 34, etc., may have turned off additional antennas exceeding L1 to save power, as such the CSI report would not have a rank indication (RI) more or greater than L1. However, occasionally (e.g., every other CSI reporting instance, or every 3, or other patterns), the wireless device 22 such as via one or more of processing circuitry 84, processor 86, radio interface 82, CSI unit 34, etc., may turn on additional antennas, or at least a set of antennas to be a total of L2 and perform a CSI measurement and report using this full antenna set of, for example, L2 total antennas. In one or more embodiments, the additional antennas exceeding L1 and equal in quantity to L2 may be specifically activated such as via one or more of processing circuitry 84, processor 86, radio interface 82, CSI unit 34, etc., for the CSI measurements, where absent the CSI measurements these antennas would remain deactivated or turned off.

In one example, the wireless device 22 such as via one or more of processing circuitry 84, processor 86, radio interface 82, CSI unit 34, etc., may notice and/or detect that it can report a RI more than L1, and as such can inform the network node 16 of a more accurate CSI (than, for example using a quantity of antennas equal to L1) in case a change to BWP 2 becomes necessary or is triggered. In another example, when the wireless device 22 such as via one or more of processing circuitry 84, processor 86, radio interface 82, CSI unit 34, etc., expects a higher load of data in the near term (i.e., within a predefined amount of time), the wireless device 22 such as via one or more of processing circuitry 84, processor 86, radio interface 82, CSI unit 34, etc., can perform CSI measurements and reporting using the higher number of antennas, thereby indicating the possibility to the network node 16 of moving to BWP2, i.e., the wireless device 22 perform measurements using the additional number of antennas without being instructed by the network node 16 to perform such measurements.

In one or more embodiments, if the BWP1 and BWP2 frequency regions are not the same but the BWP2 BW is smaller, the CSI in BWP1 is preferably provided at high enough resolution such that the network node 16 such as via one or more of processing circuitry 68, processor 70, radio interface 62, BWP unit 32, etc., can extract the BWP2 CSI info from the total BWP1 CSI. This situation may be less common as configuring a narrower BWP with more layers is a less common network configuration.

Providing CSI When BWP2 Frequency Allocation is Outside BWP1

In one or more embodiments, it is assumed that L2>L1 as discussed above, however, BWP1 is within BWP2. In one or more embodiments, this configuration for providing CSI may be applied such as via one or more of processing circuitry 84, processor 86, radio interface 82, CSI unit 34, etc., if it can be ensured that the CSI for the two BWPs (i.e., BWP1 and BWP2) can be assumed to be similar or strongly related such as if wideband CSI is used in highly dispersive environments (e.g., environments that disperse or scatter signals more than other environments), or in Line of Sight (LOS) conditions, even if the BW regions do not substantially overlap. In any case, the BWPs may be within the same component carrier.

In this case, the wireless device 22 such as via one or more of processing circuitry 84, processor 86, radio interface 82, CSI unit 34, etc., can again occasionally perform CSI measurements and reporting with higher number of antennas than L1 and at least equal to L2. In this case, the wireless device 22 such as via one or more of processing circuitry 84, processor 86, radio interface 82, CSI unit 34, etc., may report CSI parameters such as CQI, RI, and so on either based on current measurements, or an average over a number of CSI measurements instances or other criteria. For example, if the wireless device 22 such as via one or more of processing circuitry 84, processor 86, radio interface 82, CSI unit 34, etc., expects the average channel conditions across the BWP2 to remain the same or within a predefined range or in a larger scale where the cell (e.g., channel conditions of the cell) remains the same, then the wireless device 22 such as via one or more of processing circuitry 84, processor 86, radio interface 82, CSI unit 34, etc., can perform higher power CSI reporting based on average of CSI measurements, or average of RI, CQI and so on. In one or more embodiments, the wireless device 22 such as via one or more of processing circuitry 84, processor 86, radio interface 82, CSI unit 34, etc., may decide/determine to report the worst case, or consider a robustness offset such that the reported CSI measurements are reported to be worst by a predefined amount than the actual measurements. This embodiment can be extended to the case that either BWP1 and BWP2 are overlapping or even separate.

Handling Transitions to BWP with a Lower Number of MIMO Layers

Examples above focused on the cases where L2>L1; however, the same issues may exist when L1>L2. In this case where L1 is greater than L2, in one or more embodiments, the wireless device 22 such as via one or more of processing circuitry 84, processor 86, radio interface 82, CSI unit 34, etc., uses the full RX antennas or a higher number of antennas than L2 in the beginning of the move to BWP2, in order to exploit beamforming gain to compensate, for example, for potentially not well scheduled parameters by the network node 16 and to help avoid unsuccessful decoding of PDSCH. After a number (i.e. predefined number) of scheduling instances, if multiple PDSCH in a row (e.g., continuously) are acknowledged (ACKed such as via HARQ) by the wireless device 22, the wireless device 22 such as via one or more of processing circuitry 84, processor 86, radio interface 82, CSI unit 34, etc., may turn off some of the antennas to save power and note/store an indication of the number of HARQ ACKs/NACKs. If the number of NACKs is greater than the acceptable level (i.e., predefined level/threshold), the wireless device 22 such as via one or more of processing circuitry 84, processor 86, radio interface 82, CSI unit 34, etc., can turn ON additional antennas, but if the number of NACKs is below the acceptable level, the wireless device 22 such as via one or more of processing circuitry 84, processor 86, radio interface 82, CSI unit 34, etc., may turn OFF more antennas. The wireless device 22 such as via one or more of processing circuitry 84, processor 86, radio interface 82, CSI unit 34, etc., may also decide to work in higher power mode until the first CSI measurements or the first N CSI measurements are performed, after which the wireless device 22 may apply the antenna adaptation.

Additional Aspects:

For the one or more embodiments where the number of BWPs which have the different number of layers is more than one, the wireless device 22 such as via one or more of processing circuitry 84, processor 86, radio interface 82, CSI unit 34, etc., may either select one, or several, or all of the inactive BWP to be measured. If the wireless device selects or chooses to measure the CSI for one or several BWP(s), the wireless device such as via one or more of processing circuitry 84, processor 86, radio interface 82, CSI unit 34, etc., might select the BWPs, for example, starting from the most probable one, i.e., starting from the BWP most likely to be used next by the wireless device 22. This, for example, can be done based at least in part on the previous historical data, or the wireless device 22 such as via one or more of processing circuitry 84, processor 86, radio interface 82, CSI unit 34, etc., might also predict the next or anticipated BWP based at least in part on the expected traffic versus the possible throughput rate offered by each BWP, etc., In one or more embodiments, the wireless device 22 such as via one or more of processing circuitry 84, processor 86, radio interface 82, CSI unit 34, etc., might also select the BWP(s) with the most similar configuration compared to that of the active or current BWP. For example, the wireless device 22 such as via one or more of processing circuitry 84, processor 86, radio interface 82, CSI unit 34, etc., may select the BWP having the most similar frequency resources, etc. Other criterion may be used to select the next or anticipated BWP.

In one or more embodiments, the wireless device 22 such as via one or more of processing circuitry 84, processor 86, radio interface 82, CSI unit 34, etc., may also conduct CSI measurement on the additional antennas based on one or more triggers or triggering events not including following certain patterns (e.g., every other CSI reporting instance, every other 3, etc.). For example, the wireless device 22 such as via one or more of processing circuitry 84, processor 86, radio interface 82, CSI unit 34, etc., might consider the channel quality obtained from the previous measurement of CSI, SSB, or DMRS.

Network Control Aspect:

In addition to the above discussion where the wireless device 22 such as via one or more of processing circuitry 84, processor 86, radio interface 82, CSI unit 34, etc., decides or determines whether to adapt its CSI measurements and possibly configure a report with, e.g., a higher number of RX antennas, the network node 16, in one or more embodiments, such as via one or more of processing circuitry 68, processor 70, radio interface 62, BWP unit 32, etc., may initiate such an adapted CSI report in order to, for example, help ensure that adequate measurements are performed. These measurements reported by the wireless device 22 provide the network node 16 better decision metrics to be able to, for example, switch to another BWP with another number of layers, or to change the configured maximum number of layers in the current BWP. The network node 16 such as via one or more of processing circuitry 68, processor 70, radio interface 62, BWP unit 32, etc., triggering such an adapted or modified CSI report may be performed using a CSI request that mandates the evaluation of a certain number of layers, even if the currently configured maximum number of MIMO layers is lower. These CSI requests mandating special kind of measurements with, for example, additional antennas can be sent on-demand, where the network node 16 such as via one or more of processing circuitry 68, processor 70, radio interface 62, BWP unit 32, etc., has determined that it is of interest to increase channel knowledge, e.g., by determining that the channel knowledge is outdated, or that the scheduler of the network node 16 or core network has indicated that a move to another BWP or another rank is desired, but where such a move may be confirmed with an appropriate set of CSI measurements such as that use additional antennas as described herein. The CSI requests can also be configured periodically, such as with a certain periodicity, where the transmitted CSI reports are using the adapted settings.

EXAMPLES

Example 1. A method for CSI measurements and reporting in a wireless device 22 configured to operate in a BWP1 with a maximum MIMO layers equal to L1, and additionally configured with a BWP2 with maximum MIMO layers equal to L2, where L2>L1, comprising:

- in a subset of CSI measurement occasions, where the subset is strictly smaller than the full set of occasions, performing CSI measurements using a number of RX antennas equal to at least L2 and evaluating DL configurations of up to L2 MIMO layers; and
- reporting results of the CSI measurements to the network node 16 in a format that allows extracting BWP2 info.

Example 2. The method of Example 1, wherein the subset of measurement occasions is a periodic pattern, or where it comprises occasions triggered by traffic changes, channel changes, etc.

Example, 3. The method of any one of Examples 1-2, wherein the formats comprise:

- one or more of wide-band, filtered, or offset reporting if BWP2 lies outside BWP1,
- or narrow-band reporting if BWP2 lies inside BWP1.

Example 4. The method of any one of Examples 1-3, wherein the subset of measurements occasions is configured by the network node 16, in a periodic pattern, or where the configuration is a result of occasions triggered by traffic changes, channel changes, etc.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the “C” programming language. The program code may execute entirely on the user’s computer, partly on the user’s computer, as a stand-alone software package, partly on the user’s computer and partly on a remote computer or entirely on the remote computer. In the latter scenario, the remote computer may be connected to the user’s computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment A1. A network node configured to communicate with a wireless device (WD), the network node configured to, and/or comprising a radio interface and/or comprising processing circuitry configured to:

receive at least one channel state information, CSI, report associated with at least one CSI measurement using more antennas than a maximum number of layers configured for a current active bandwidth part, BWP.

Embodiment A2. The network node of Embodiment A1, wherein the network node is further configured to, and/or the radio interface and/or processing circuitry is further configured to initiate the at least one CSI measurement using the more antennas.

Embodiment A3. The network node of any one of Embodiments A1-A2, wherein the at least one CSI measurement is associated with an anticipated transition of the wireless device from a current BWP to another BWP.

Embodiment B1. A method implemented in a network node that is configured to communicate with a wireless device, the method comprising:

receiving at least one channel state information, CSI, report associated with at least one CSI measurement using more antennas than a maximum number of layers configured for a current active bandwidth part, BWP.

Embodiment B2. The method of Embodiment B1, wherein the network node is further configured to, and/or the radio interface and/or processing circuitry is further configured to initiate the at least one CSI measurement using the more antennas Embodiment B3. The method of any one of Embodiments B1-B2, wherein the at least one CSI measurement is associated with an anticipated transition of the wireless device from a current BWP to another BWP.

Embodiment C1. A wireless device (WD) configured to communicate with a network node, the WD configured to, and/or comprising a radio interface and/or processing circuitry configured to:

perform at least one channel state information, CSI, measurement using more antennas than a maximum number of layers configured for a current active bandwidth part, BWP.

Embodiment C2. The WD of Embodiment C1, wherein the WD is further configured to, and/or the radio interface and/or processing circuitry is further configured to initiate the using of the more antennas for the at least one CSI measurement.

Embodiment C3. The WD of Embodiment C1, wherein the WD is further configured to, and/or the radio interface and/or processing circuitry is further configured to receive a request from the network node to use the more antennas for the at least one CSI measurement.

Embodiment C4. The WD of any one of Embodiments C1-C3, wherein the at least one CSI measurement is associated with an anticipated transition of the wireless device from a current BWP to another BWP.

Embodiment D1. A method implemented in a wireless device (WD) that is configured to communicate with a network node, the method comprising:

performing at least one channel state information, CSI, measurement using more antennas than a maximum number of layers configured for a current active bandwidth part, BWP.

Embodiment D2. The method of Embodiment D1, wherein the WD is further configured to, and/or the radio interface and/or processing circuitry is further configured to initiate the using of the more antennas for the at least one CSI measurement.

Embodiment D3. The method of Embodiment D1, wherein the WD is further configured to, and/or the radio interface and/or processing circuitry is further configured to receive a request from the network node to use the more antennas for the at least one CSI measurement.

Embodiment D4. The method of any one of Embodiments D1-D3, wherein the at least one CSI measurement is associated with an anticipated transition of the wireless device from a current BWP to another BWP.

The invention claimed is:

1. A network node configured to communicate with a wireless device (WD), the network node comprising processing circuitry configured to:

determine a bandwidth part (BWP) to which the wireless device transitions to;

inform the wireless device of the determined BWP; and receive at least one channel state information (CSI) report associated with at least one CSI measurement using more antennas than a maximum number of layers configured for a current active BWP, wherein the WD and/or the radio interface and/or processing circuitry is configured to, based on an indication of a number of hybrid automatic request (HARQ) acknowledgement/non-acknowledgements (ACKs/NACKs) configure a number of receiver antennas such that when the number of NACKs is greater than a predetermined level additional antennas are turned ON, and when the number of NACKs is below the predetermined level one or more antennas are turned OFF, wherein the processing circuitry is configured to initiate the at least one CSI measurement using the more antennas than the maximum number of layers configured for the current active BWP.

2. The network node of claim 1, wherein the at least one CSI measurement is associated with an anticipated transition of the WD from a current BWP to another BWP.

3. A method implemented in a network node that is configured to communicate with a wireless device, the method comprising:

determine a bandwidth part (BWP) to which the wireless device transitions to;

inform the wireless device of the determined BWP; and receiving at least one channel state information (CSI) report associated with at least one CSI measurement using more antennas than a maximum number of layers configured for a current active BWP, wherein the wireless device is configured to, based on an indication of a number of hybrid automatic request (HARQ) acknowledgement/non-acknowledgements (ACKs/NACKs), configure a number of receiver antennas such that when the number of NACKs is greater than a predetermined level additional antennas are turned ON, and when the number of NACKs is below the predetermined level one or more antennas are turned OFF, wherein the wireless device is configured to initiate the at least one CSI measurement using the more antennas than the number of layers configured for the current active BWP.

4. The method of claim 3, wherein the at least one CSI measurement is associated with an anticipated transition of the wireless device from a current BWP to another BWP.

5. A wireless device (WD) configured to communicate with a network node, the WD comprising processing circuitry configured to:

receive a request from the network node to use more antennas for at least one channel state information (CSI) measurement; and perform at least one CSI measurement using more antennas than a maximum number of layers configured for a current active bandwidth part (BWP), wherein the WD and/or the radio interface and/or processing circuitry is configured to initially use all receiver antennas or a higher number of antennas than a maximum number of layers L2 on a move to another bandwidth part BWP2, wherein the initial use of all receiver antennas or a higher number of antennas than the maximum number of layers L2 on the move to bandwidth part BWP2 includes to use all receiver antennas or a higher number of antennas than the maximum number of layers L2, and then after a predetermined number of scheduling instances to turn off one or more receiver antennas, and wherein the WD and/or the radio interface and/or processing circuitry is configured to, based on an indication of a number of hybrid automatic request (HARQ) acknowledgement/non-acknowledgements (ACKs/NACKs) configure the number of receiver antennas such that when the number of NACKs is greater than a predetermined level additional receiver antennas are turned ON, and when the number of NACKs is below the predetermined level one or more receiver antennas are turned OFF, wherein the processing circuitry is configured to initiate the at least one CSI measurement using the more antennas than the maximum number of layers configured for the current active bandwidth part (BWP).

6. The WD of claim 5, wherein the at least one CSI measurement is associated with an anticipated transition of the WD from a current BWP to another BWP.

7. The WD of claim 5, wherein the current BWP is a first bandwidth part (BWP1) with a first maximum number of layers (L1) and the another BWP is a second bandwidth part (BWP2) with a second maximum number of layers (L2), where L1 is larger than L2.

8. The WD of claim 5, wherein the processing circuitry is configured to omit power saving until a first CSI measurement or first N CSI measurements are performed, where N is a predetermined number, and then the WD applies a power saving antenna adaptation.

9. A method implemented in a wireless device (WD) that is configured to communicate with a network node, the method comprising:

receiving a request from the network node to use more antennas for at least one channel state information (CSI) measurement; and performing at least one CSI measurement using more antennas than a maximum number of layers configured for a current active bandwidth part (BWP), wherein the at least one CSI measurement is associated with an anticipated transition of the WD from a current BWP to another BWP, wherein the current BWP is a first bandwidth part (BWP1) with a first maximum number of layers (L1) and the another BWP is a second bandwidth part (BWP2) with a second maximum number of layers (L2) where L1 is larger than L2, the method comprising initially using all receiver antennas or a higher number of antennas than L2 on a move to BWP2, wherein the initial using of all receiver antennas or a higher number of antennas than the second maximum number of layers L2 on the move to BWP2 includes using all receiver antennas or a higher number of antennas than the second maximum number of layers L2, and then after a predetermined number of scheduling instances turning off one or more receiver antennas, wherein the number of receiver antennas is configured based on an indication of a number of hybrid automatic request (HARQ) acknowledgement/non-acknowledgements (ACKs/NACKs) such that when the number of NACKs is greater than a predetermined level additional receiver antennas are turned ON, and when the number of NACKs is below the predetermined level one or more receiver antennas are turned OFF, the method further comprising initiating the at least one CSI measurement using the more antennas than the maximum number of layers configured for the current active bandwidth part (BWP).

10. The method of claim 9, wherein the current BWP is a first bandwidth part (BWP1) with a first maximum number of layers (L1) and the another BWP is a second bandwidth part (BWP2) with a second maximum number of layers (L2) where L1 is larger than L2.

11. The method of claim 9, comprising omitting power saving until a first CSI measurement or first N CSI measurements are performed, where N is a predetermined number, and then applying a power saving antenna adaptation.

* * * * *